Figure 1:
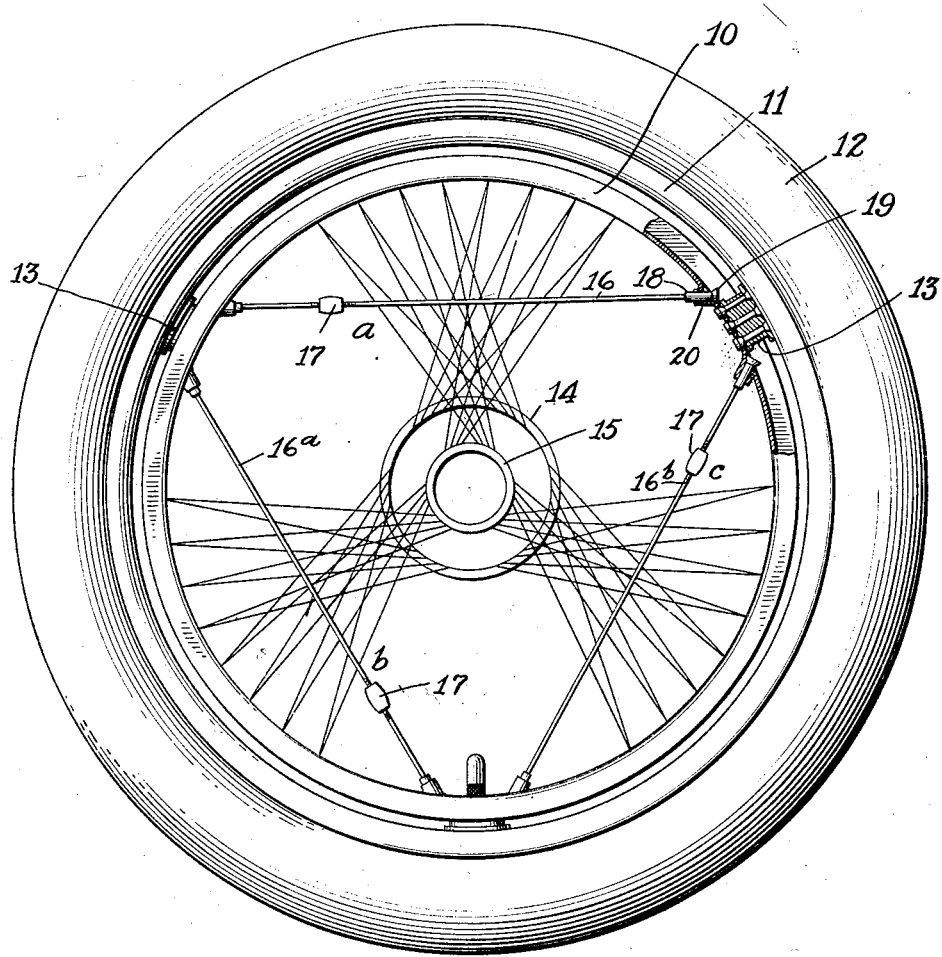

Dec. 27, 1927.

F. W. BAKER 1,653,612

WIRE SPOKE WHEEL

Filed Sept. 23, 1925

INVENTOR,
Frederick W. Baker,
BY
Ramsay Hoguet.
ATTORNEY

Patented Dec. 27, 1927.

1,653,612

UNITED STATES PATENT OFFICE.

FREDERICK WILLIAM BAKER, OF STOURBRIDGE, ENGLAND, ASSIGNOR TO TRINITY WHEEL CORPORATION, A CORPORATION OF NEW YORK.

WIRE-SPOKE WHEEL.

Application filed September 23, 1925. Serial No. 58,135.

My invention relates to improvements in vehicle wheels, and more especially to wheels of the wire spoke variety such as are adapted for use on automobiles. My invention is in some respects a development of the principle illustrated in my application for Letters Patent of the United States filed February 2nd, 1920, Serial No. 355,631, and in Letters Patent of the United States No. 1,524,806, dated February 3rd, 1925.

In the application and patent above referred to I disclose a three armed spider spoke system, in which the arms of the spoke system are symmetrically arranged and connect to the rim of the wheel at equidistant points for the purpose of preserving the resilience of the wheel, distributing the shock and preventing distortion. My invention has to a certain extent the same idea, that is to say it embodies wire spokes of a known type, or of any preferred type, which however, are arranged in groups, preferably three, connecting the hub with the rim of the wheel after the manner of my earlier inventions referred to. The object of my present invention is to preserve the economy and resilience of spring spoke wheels, and at the same time give the wheel unusual strength. The invention is further intended to produce a strong, economical, resilient wheel in which the stress and strain are distributed in a manner to prevent distortion of the wheel. These and other advantages will appear more clearly from the description which follows.

Reference is to be had to the accompanying drawings forming a part of this specification, in which similar reference characters indicate corresponding parts in all the views.

Figure 2:
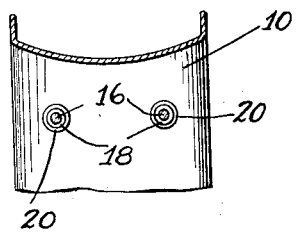

Figure 1 is a side elevation of the wheel embodying my invention, with parts broken away and in section, and Figure 2 is a detail showing the arrangement of the stay rods.

So far as the rim, tire, and connection between the rim and tire construction is concerned, the wheel may be of any usual or preferred type. As illustrated I show an inner rim 10, an outer rim 11 spaced apart from the inner rim and concentric therewith, a tire 12, and bearers or blocks 13 between the rims and spaced at equi-distant points. As shown in the drawings these bearers are rigidly attached to the inner rim 10, but they are shown diagrammatically, and may be detachable or otherwise as preferred, the important thing being to have them spaced as stated, and in the manner disclosed in my earlier applications above referred to.

The spoke system of the wheel is the important feature, comprising a grouping of wire spokes and the cross stays to stiffen the wheel. These spokes are arranged in groups $a$, $b$ and $c$, preferably three in number, and the wire spokes of each group may be of any usual or preferred kind, and can be attached to the hub and rim in any suitable manner. I have not gone into this in detail because it has nothing to do with the present invention, which comprises the grouping of the spokes rather than their individual characteristics, and the spokes and hub structures are therefore shown diagrammatically. It will be notched, however, that the spokes are tangentially arranged with respect to the larger and smaller parts 14 and 15 of the hub to which they are connected in any preferred way, and that the groupings of spokes connect with the hub parts at points equi-distant around the hub, and that the groupings connect with the inner rim 10 at points substantially midway between the bearers 13. Thus the principle of my earlier application is preserved, that is to say the natural resilience of the outer rim is utilized in the sectors occurring between the bearers 13, and the natural resilience of the inner rim is utilized in the sectors between the spoke groupings.

The arrangement just described provides for great resilience, but the wheel may have a tendency to contort if the spoke groupings alone as described and shown were relied on, and to provide against such contortion and to afford a simple and sufficient strengthening of the wheel, I provide a series of stay rods 16, 16$^a$ and 16$^b$, which are preferably connected in pairs as illustrated in Figure 2, but which may be arranged singly, and these stay rods extend tangentially across the wheel, connecting with the inner rim near the bearers 13. The connection can be in any usual or preferred way. As shown the rods have enlarged end portions 18 with heads 19, and are held in the nipple 20 of the inner rim. The rods may be simply straight rods of the right length to connect across the wheel as stated. They can be provided with means for adjusting their length, as for example the turnbuckles 17. In any event they are under tension.

The arrangement of the stay rods 16, 16ª and 16ᵇ is particularly useful in building up or manufacturing the wheel, as it prevents the distortion of the rim 10 while the wire spokes are being applied, but after the spokes are in place the stay rods may or may not be used, as desired. Where they are used it is obvious that the wheel is greatly strengthened.

It will be noticed that this arrangement while exceedingly simple and inexpensive, is enormously strong, as the tendency of the wheel to flatten or distort brings a lengthwise strain on the stay rods, which can be given any desired tensile strength within reasonable limits.

It will be further noticed that when the load is suspended from one spoke grouping, the strain is distributed to the several other groupings and to the three points of the rim to which the stay rods connect. It will be further noticed that while the invention is peculiarly adapted to two rimmed wheels and pneumatic tires, the novel arrangement of the spoke system, including both individual spokes and stay rods, is such that any preferred construction outside the inner rim can be utilized or employed without affecting the invention.

I claim:—

1. A vehicle wheel comprising a rim and hub, wire spokes arranged in groups to connect the rim and hub leaving clear spaces between the groups, and stay rods extending across the wheel and connected to the rim at points between the spoke groupings.

2. A vehicle wheel comprising a rim and hub, groups of wire spokes connecting the rim and hub and tangentially arranged with respect to the hub, and stay rods extending across the wheel and connected to the rim at points between the spoke groupings.

3. A vehicle wheel according to claim 1, characterized by the further fact that the stay rods are longitudinally adjustable.

4. A vehicle wheel comprising a rim, a hub, groups of wire spokes connecting the hub and rim, with clear spaces between the spoke groupings, and stay rods arranged in pairs extending across the wheel and connected with the rim at points between the spoke groupings.

5. A vehicle wheel comprising inner and outer rims spaced apart and with bearers at equi-distant points between them, a hub, wire spokes arranged in groups and extending from equi-distant points around the hub to points midway between the aforesaid bearers, and stay rods extending across the wheel and connected to the rim at points adjacent the aforesaid bearers.

6. A vehicle wheel comprising a rim and hub, wire spokes arranged in groups to connect the rim and hub leaving clear spaces between the groups, and means between the groups of spokes for relieving them of excessive strain.

7. A vehicle wheel comprising inner and outer rims spaced apart and with bearers at equi-distant points between them, and stay rods extending across the wheel and connected to the rim at points adjacent the aforesaid bearers.

In testimony whereof, I have signed my name to this specification this 16th day of September 1925.

FREDERICK WILLIAM BAKER.